No. 736,233. PATENTED AUG. 11, 1903.
C. DAVIS.
GOLF BALL.
APPLICATION FILED MAR. 16, 1903.
NO MODEL.

No. 736,233. Patented August 11, 1903.

UNITED STATES PATENT OFFICE.

CLELAND DAVIS, OF THE UNITED STATES NAVY, ASSIGNOR TO THE CAMBRIDGE MANUFACTURING COMPANY, OF WILMINGTON, DELAWARE, A CORPORATION OF DELAWARE.

GOLF-BALL.

SPECIFICATION forming part of Letters Patent No. 736,233, dated August 11, 1903.

Application filed March 16, 1903. Serial No. 148,015. (No model.)

*To all whom it may concern:*

Be it known that I, CLELAND DAVIS, lieutenant in the United States Navy, a citizen of the United States, residing at Washington, in the District of Columbia, have invented certain new and useful Improvements in Golf-Balls; and I do hereby declare the following to be a full, clear, and exact description of the invention, such as will enable others skilled in the art to which it appertains to make and use the same.

My invention relates to improvements in golf-balls, and it is intended to provide a golf-ball combining those qualities that will give extreme and accurate flight and at the same time will be well conditioned for putting or approaching.

My invention will be understood by reference to the accompanying drawings, in which the same parts are indicated by the same letters throughout the several views.

Figure 1:
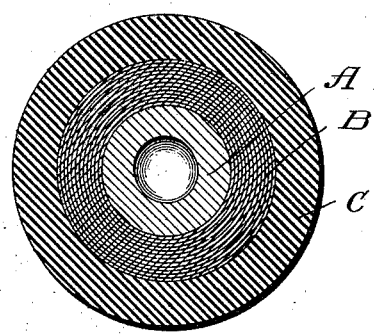
Figure 2:
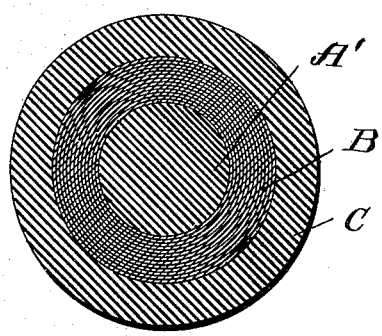
Figure 3:
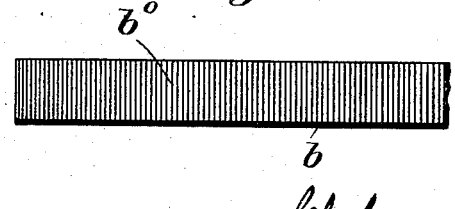

Figure 1 represents a cross-section of a ball having a hollow core. Fig. 2 represents a cross-section of a ball having a solid core, and Fig. 3 is a detail showing the rubber strip used in the construction of the ball shown in Figs. 1 and 2.

Referring first to Fig. 1, A represents a hollow core, preferably of some material that is heavier than water, such as a nitrocellulose compound, which may be either celluloid or smokeless powder or any suitable nitrocellulose compound. B represents a layer composed of one or more rubber strips *b*, as shown in Fig. 3. Such rubber strips as ordinarily constructed have the grain running longitudinally of the rubber, but by having the grain running transversely, as illustrated by the lines $b^\circ$ in Fig. 3, the rubber strip adapts itself more readily to the core on which it is wound and at the same time makes a harder firmer layer and of higher elasticity than where the strip is wound around with its grain parallel to the longitudinal axis of the strip. C represents an outer layer or shell of gutta-percha or balata gum which is compressed over the layer of rubber and forms a jacket therefor.

In the form of device shown in Fig. 2 the structure is the same as that shown in Fig. 1, except that a solid core A' is used, which core may be of any suitable material, such as gutta-percha.

Having thus described my invention, what I claim, and desire to secure by Letters Patent of the United States, is—

1. A golf-ball comprising a core, a continuous rubber strip having the grain running transversely, stretched thereon, and an outer shell of elastic material inclosing the whole, substantially as described.

2. A golf-ball comprising a spherical core, a continuous rubber strip having the grain running transversely, wound over said core under tension, and an inclosing shell of elastic material compressed over the whole, substantially as described.

3. A golf-ball comprising a spherical core, a continuous rubber strip having the grain running transversely, stretched thereon under tension and forming a hollow cylindrical layer about said core, and a spherical shell of balata compressed over said layer of rubber, substantially as described.

In testimony whereof I affix my signature in presence of two witnesses.

CLELAND DAVIS.

Witnesses:
 FRANK D. BLACKISTONE,
 FRED W. ENGLERT.